(12) United States Patent
Yang et al.

(10) Patent No.: US 11,030,045 B2
(45) Date of Patent: Jun. 8, 2021

(54) APPARATUS AND METHOD FOR UTILIZING DIFFERENT DATA STORAGE TYPES TO STORE PRIMARY AND REPLICATED DATABASE DIRECTORIES

(71) Applicant: Futurewei Technologies, Inc., Plano, TX (US)

(72) Inventors: Bai Yang, Cupertino, CA (US); Guogen Zhang, San Jose, CA (US)

(73) Assignee: Futurewei Technologies, Inc., Plano, TX (US)

(*) Notice: Subject to any disclaimer, the term of this patent is extended or adjusted under 35 U.S.C. 154(b) by 1098 days.

(21) Appl. No.: 14/811,739

(22) Filed: Jul. 28, 2015

(65) Prior Publication Data

US 2017/0031765 A1 Feb. 2, 2017

(51) Int. Cl.
*G06F 11/14* (2006.01)
*G06F 11/20* (2006.01)
*G06F 11/16* (2006.01)

(52) U.S. Cl.
CPC ...... *G06F 11/1435* (2013.01); *G06F 11/1451* (2013.01); *G06F 11/1464* (2013.01); *G06F 11/1469* (2013.01); *G06F 11/1662* (2013.01); *G06F 11/201* (2013.01); *G06F 11/2023* (2013.01); *G06F 11/2035* (2013.01); *G06F 11/2046* (2013.01); *G06F 11/2094* (2013.01); *G06F 2201/80* (2013.01); *G06F 2201/84* (2013.01); *G06F 2201/85* (2013.01)

(58) Field of Classification Search
CPC ............ G06F 11/1435; G06F 11/1451; G06F 11/1464; G06F 11/1469; G06F 11/201; G06F 11/2023; G06F 11/2035; G06F 11/2046; G06F 11/2094
See application file for complete search history.

(56) References Cited

U.S. PATENT DOCUMENTS

| 5,668,943 A | 9/1997 | Attanasio et al. |
| 5,907,849 A * | 5/1999 | Dias .................... G06F 11/2046 |

(Continued)

FOREIGN PATENT DOCUMENTS

| CN | 1848989 A | 10/2006 |
| CN | 102254031 A | 11/2011 |

(Continued)

OTHER PUBLICATIONS

Wikipedia, "Shared disk architecture," Nov. 12, 2012, p. 1, retrieved from http://en.wikipedia.org/wiki/Shared_disk_architecture.

(Continued)

*Primary Examiner* — Yolanda L Wilson
(74) *Attorney, Agent, or Firm* — Schwegman Lundberg & Woessner, P.A.

(57) ABSTRACT

An apparatus and method are provided for utilizing different data storage types to store primary and replicated database directories. Included is a first data storage of a first data storage type including a direct-access storage type. The first data storage is configured to store a primary database directory. Also included is a second data storage of a second data storage type including a share type. The second data storage is configured to store a replicated database directory that replicates at least a portion of the primary database directory.

37 Claims, 10 Drawing Sheets

(56) References Cited

U.S. PATENT DOCUMENTS

| | | | |
|---|---|---|---|
| 6,182,075 B1* | 1/2001 | Hsu | H04L 29/06 |
| 6,292,905 B1 | 9/2001 | Wallach et al. | |
| 6,366,987 B1* | 4/2002 | Tzelnic | G06F 11/1451 |
| | | | 711/112 |
| 7,797,281 B1 | 9/2010 | Greene et al. | |
| 8,180,728 B2 | 5/2012 | Jackson | |
| 8,595,192 B1* | 11/2013 | Manmohan | G06F 17/30289 |
| | | | 707/678 |
| 2004/0220981 A1 | 11/2004 | Taylor | |
| 2005/0038834 A1* | 2/2005 | Souder | G06F 9/5027 |
| 2006/0075059 A1* | 4/2006 | Drepper | G06F 9/544 |
| | | | 709/213 |
| 2010/0262629 A1 | 10/2010 | Adelman et al. | |
| 2014/0047263 A1* | 2/2014 | Coatney | G06F 11/2023 |
| | | | 714/4.11 |
| 2014/0108633 A1 | 4/2014 | Dai et al. | |
| 2014/0280031 A1 | 9/2014 | Zhou et al. | |
| 2014/0317438 A1* | 10/2014 | Ripoll | G06F 11/2035 |
| | | | 714/4.11 |

FOREIGN PATENT DOCUMENTS

| | | | |
|---|---|---|---|
| CN | 103309772 A | 9/2013 | |
| CN | 103425551 A | 12/2013 | |
| WO | 9854648 A1 | 12/1998 | |

OTHER PUBLICATIONS

Wikipedia, "Shared nothing architecture," Jun. 12, 2015, pp. 1-3, retrieved from http://en.wikipedia.org/wiki/Shared_nothing_architecture.

International Search Report from International Application No. PCT/CN2016/091894, dated Nov. 1, 2016.

"Chinese Application No. 201680044347.3, Office Action dated Oct. 21, 2019", dated Oct. 21, 2019, 11 pgs.

"Chinese Application No. 201680044347.3, Office Action dated Oct. 21, 2019", (w/ English Translation), 17 pgs.

"Chinese Application No. 201680044347.3. Chinese Search Report dated Mar. 12, 2021", (Mar. 12, 2021), 7 pgs.

Zhang, Xiongling, "Design and Implementation of a database Remote Backup System", B.E. (Beijing Information Science and Technology University), a thesis submitted in partial satisfaction of the requirements for the degree of Master of Engineering in the Graduate School of Hunan University, (May 7, 2013), 87 pgs.

Zhangbing, Li, "A New Algorithm for Data Consistency Based on Primary Copy Data Queue Control in Distributed Database", 2011 IEEE 3rd International Conference on Communication Software and Networks, Xi'an, China, 2011, pp. 207-210, doi: 10.1109/ICCSN.2011.6014424, (Sep. 8, 2011), 207-210.

* cited by examiner

APPARATUS AND METHOD FOR UTILIZING DIFFERENT DATA STORAGE TYPES TO STORE PRIMARY AND REPLICATED DATABASE DIRECTORIES

FIELD OF THE INVENTION

The present invention relates to databases, and more particularly to database replication techniques.

BACKGROUND

There are two prevalent types of storage architectures, a share-nothing architecture and a shared architecture. In a share-nothing architecture, a network interface provides network connectivity to a plurality of nodes which, in turn, are permitted access only to corresponding storages that are directly connected to such nodes. In accordance with the name attic share-nothing architecture, each of the nodes is permitted to share nothing among the storages of other nodes.

In a shared storage architecture, a network interface is directly connected to a plurality of nodes. Such network interface further provides shared network connectivity to shared storage. In accordance with the name of the shared architecture, each of the nodes is permitted to share the shared storage with other nodes.

Compared with the shared architecture (in the context of at least analytics applications), the share-nothing architecture is typically cheaper and has better performance/scalability, since throughput is key in such applications and the storages are directly connected to corresponding nodes to provide better throughput. White there is nothing to share when a system needs to access data from its local storages, the share-nothing architecture may not be able to provide service when a system or storages connected to the system go down.

Specifically, primary database instances and database directories are typically created on one node and standby database instances and replicated database directories are created on another node. If a node with the primary database instance goes down, the standby instance running on the other node typically takes over. A significant problem for the share-nothing architecture, however, arises when both nodes fail, and neither the primary nor secondary database instances and database directories are available. To this end, availability is a significant potential issue for the share-nothing architecture.

In contrast, the shared architecture typically exhibits high availability. Unfortunately, this availability comes with significant expense. Additionally, the shared architecture can exhibit challenges in scalability. When most or all nodes require access to data on the shared storage, the network interface may become a bottleneck, since all the nodes share the same network interface. To this end, when the shared architecture is scaled, the addition of more nodes may not necessarily be able to improve performance. Thus, scalability and price are significant issues for the shared architecture.

There is thus a need for addressing these and/or other issues associated with the prior art.

SUMMARY

An apparatus and method are provided for utilizing different data storage types to store primary and replicated database directories. Included is a first data storage of a first data storage type including a direct-access storage type. The first data storage is configured to store a primary database directory. Also included is a second data storage of a second data storage type including a share type. The second data storage is configured to store a replicated database directory that replicates at least a portion of the primary database directory.

DETAILED DESCRIPTION

Figure 1:
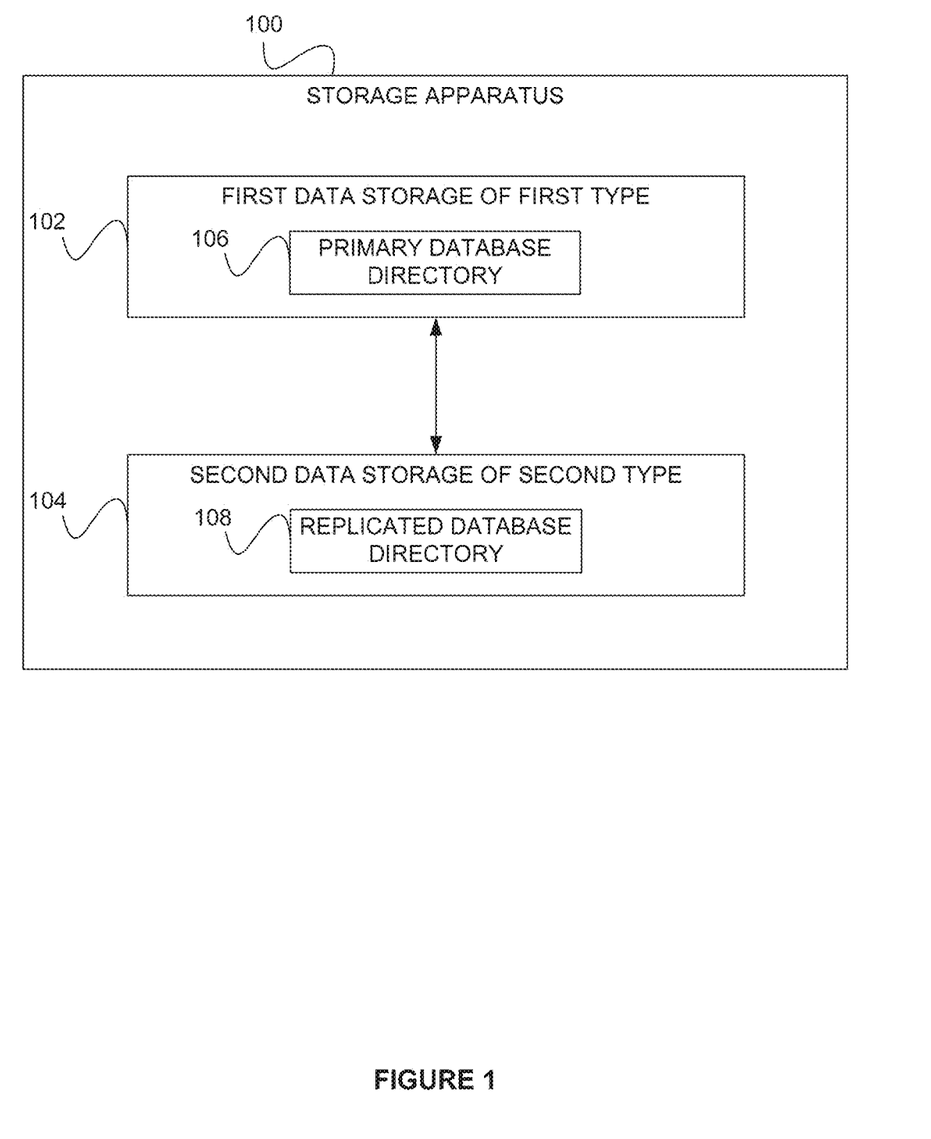
FIG. 1 illustrates a storage apparatus for utilizing different data storage types to store primary and replicated database directories, in accordance with one embodiment.

FIG. 1 illustrates a storage apparatus 100 for utilizing different data storage types to store primary and replicated database directories, in accordance with one embodiment. As shown, a first data storage 102 of a first data storage type is included with a primary database directory 106 stored thereon. Further included is a second data storage 104 of a second data storage type with a replicated database directory 108 stored thereon.

In the context of the present description, the first data storage 102 of the first data storage type and the second data storage 104 of the second data storage type may include any data storages capable of storing data insofar as they are of different types. Just by way of example, the first data storage 102 of the first data storage type may, in one possible embodiment, include a direct-access storage (DAS) type. In the context of the present description, the DAS type may include any storage type that provides direct access to the storage. In one possible embodiment, the DAS type may possibly include a storage type where each physical record has a discrete location and a unique address. In another possible embodiment, the DAS type may include a share-nothing type.

Still yet, the second data storage 104 of the second data storage type may be of a differing type, by including a share type. In the context of the present description, such share type may include any data storage type that allows sharing of storage resources. For purposes of illustration, such share type may, in various embodiments, include a cloud storage type, a storage area network (SAN) storage type, etc.

In use, the first data storage 102 is configured to store the primary database directory 106. The second data storage 104 is configured to store the replicated database directory 108 that replicates at least a portion of the primary database directory 106. In the present description, a data directory refers to any data structure that supports access to data in a corresponding data storage. A primary database directory refers to any database directory that is utilized more often than a replicated database directory. For example, in one possible embodiment, the primary database directory 106 may serve as the database directory during normal operation (e.g. without failure in connection with the first data storage 102, etc.), while the replicated database directory 108 may serve as the database directory when the primary database directory 106 is otherwise unavailable (e.g. during a failure, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described. Just by way of example, in various embodiments to be described, increased performance/scalability and affordability in price may be afforded by strategically situating primary database directories on DAS-type storage and replicated database directories on shared-type storage, which is available to all nodes.

Figure 2:
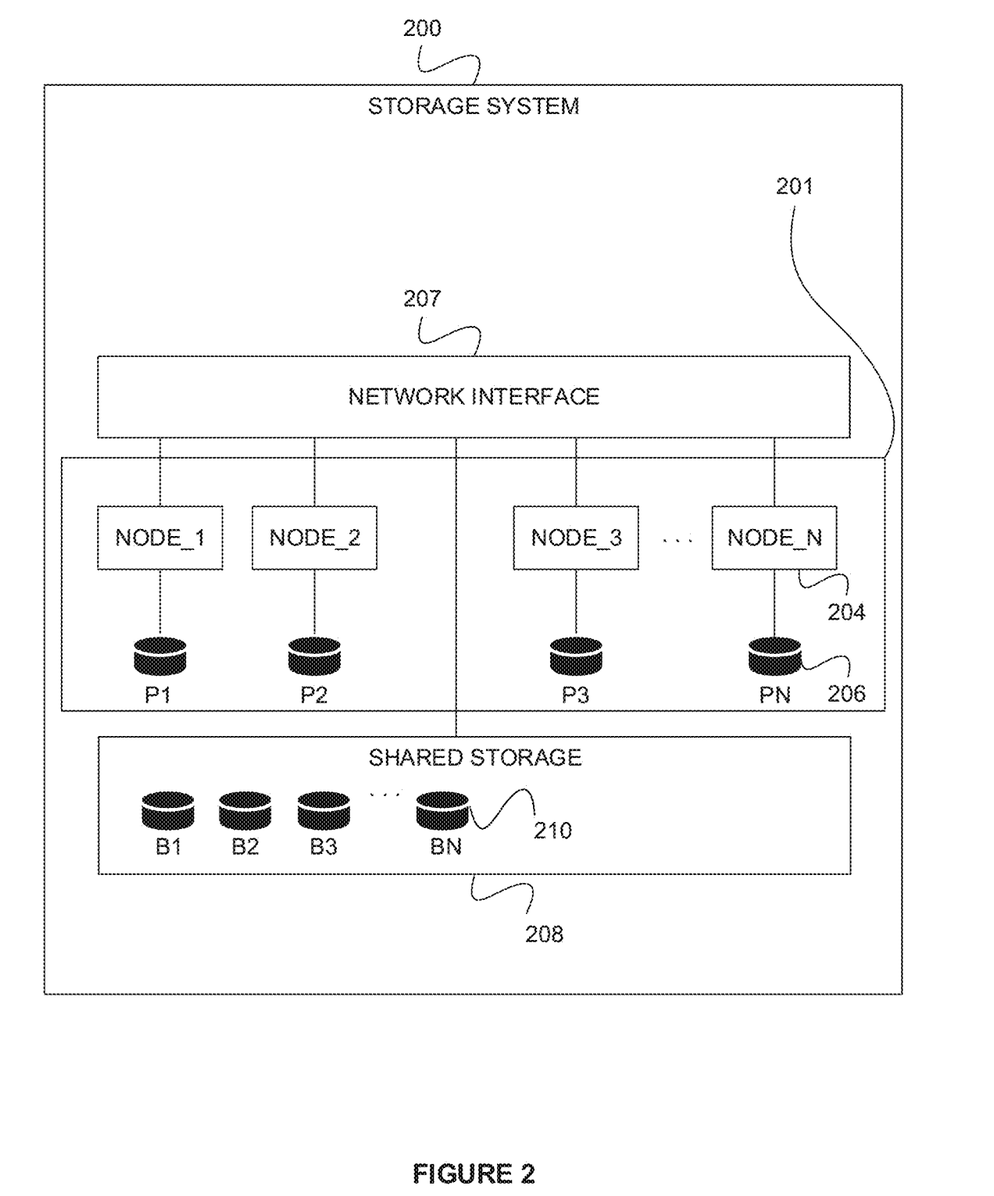
FIG. 2 illustrates a storage system for utilizing different data storage types to store primary and replicated database directories, in accordance with a shared storage embodiment.

FIG. 2 illustrates a storage system 200 for utilizing different data storage types to store primary and replicated database directories, in accordance with a shared storage embodiment. As an option, the storage system 200 may be implemented in the context of any one or more of the embodiments set forth in any previous and/or subsequent figure(s) and/or description thereof. Still yet, in one embodiment, the storage system 200 may be implemented in the context of a massive parallel processing (MPP) storage system. Of course, however, the storage system 200 may be implemented in the context of any desired environment.

As shown, the storage system 200 includes a network interface 207, a plurality of nodes 204 coupled to the network interface 207, a corresponding plurality of share-nothing primary storages 206 coupled to the plurality of nodes 204, and a share-type storage device 208 coupled to the network interface 207. Specifically, a DAS-type storage device 201 is provided with at least one primary database directory (P1, P2 . . . PN) stored thereon, such as in a share-nothing primary storage 206. The DAS-type storage device 201 includes the plurality of nodes 204 each in communication with the corresponding one of the plurality of primary storages 206 of the DAS-type storage device 201, in one embodiment, each node 204 may include a processor and memory for running a processing instance capable of accessing, operating on, and/or writing data in connection with the corresponding primary storage 206 of the DAS-type storage device 201, utilizing the primary database directory stored on the corresponding primary storage 206. In use, each of the nodes 204 and data of the corresponding primary storage 206 are further accessible via the network interface 207, in the manner shown.

The storage system 200 is further shown to include the share-type storage device 208 with at least one replicated database directory (B1, B2 . . . PB) stored thereon. In the current embodiment, such share-type storage device 208 may take the form of a shared storage system, or the like. As shown, the share-type storage device 208 includes a plurality of back-up replicated storages 210 storing at least one replicated database directory. In one optional embodiment, the storage system 200 may be configured such that share-type storage device 208 (and/or the network interface 207) has a first bandwidth that is greater than a second bandwidth of one or more of the primary storages 206 of the DAS-type storage device 201, but less than an aggregation of the bandwidths of all of the primary storages 206 of the DAS-type storage device 201. In use, the back-up replicated storages 210 and corresponding replicated database directory may be accessible to the nodes 204 of the DAS-type storage device 201 via the network interface 207, in the manner shown.

As mentioned earlier, in the present embodiment, increased performance/scalability and affordability in price may be afforded by strategically situating the primary database directories on the DAS-type storage device 201 and the replicated database directories on the share-type storage device 208, which is available to all the nodes 204. Since the replicated database directories are available to all the nodes 204, there is not necessarily a need for standby processes to apply logs or copy files, and the database instances can start two threads to operate simultaneously, for writing the data to the primary storages 206 and the back-up replicated storages 210. For a considerable amount of operation (e.g. during normal mode, etc.), the queries running on the storage system 200 are read-only queries. When the storage system 200 is in normal mode, access to the DAS-type storage device 201 occurs to get the data required. During such mode, there is not necessarily a need for access to the share-type storage device 208.

When one or more of the primary storages 206 of the DAS-type storage device 201 fails, database instances may use the replicated database directories on the back-up replicated storages 210. For the most part, the share-type storage device 208 has better throughput than the DAS-type storage device 201 has on one of the nodes 204, particularly if the bandwidth guideline set forth hereinabove is implemented.

In use, when the DAS-type storage device 201 only has a few nodes 204 or primary storages 206 that fail, the network interface 207 does not necessarily become a bottleneck to access the share-type storage device 208. In a situation where the DAS-type storage device 201 has a lot of nodes 204 or primary storages 206 that fail, performance may be degraded, but the storage system 200 can still provide service. Specifically, as long as the DAS-type storage device 201 has at least one node 204 available, the storage system 200, with its replication on the share-type storage device 208, can still provide service.

To this end, performance may be as good as a shared-nothing architecture for read-only queries when the storage system 200 is in normal mode. Further, when the DAS-type storage device 201 has some nodes 204 or primary storages 206 that fail, the storage system 200 can still provide service with reasonable performance. Further, access to the share-type storage device 208 occurs during load, insert/update/delete, failover, rebuild, etc. operations; and when the DAS-type storage device 201 has nodes 204 or primary storages 206 that fail. Thus, a balance is struck between performance/scalability and affordability.

Figure 3:
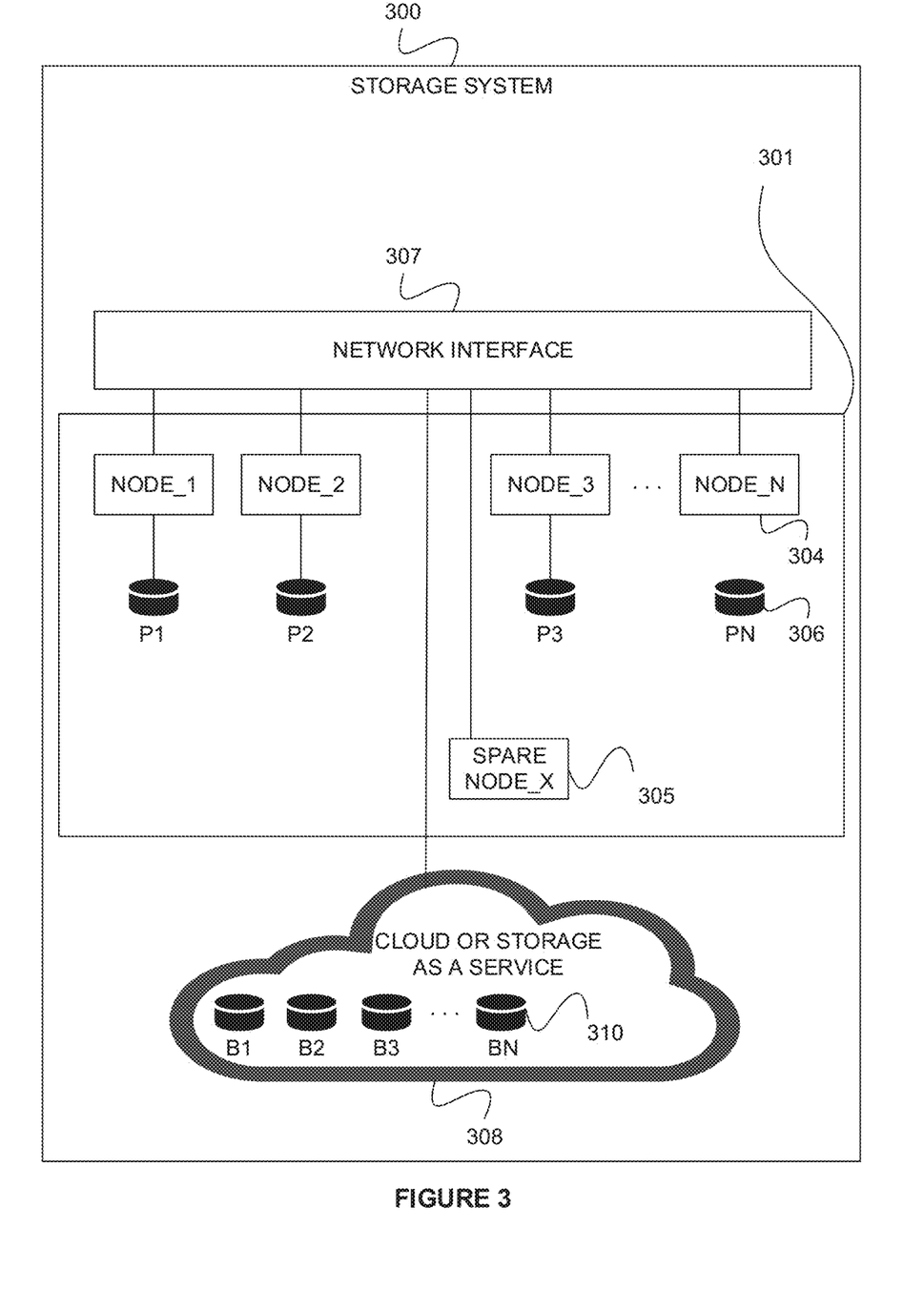
FIG. 3 illustrates a storage system for utilizing different data storage types to store primary and replicated database directories, in accordance with a cloud-based or storage service-based embodiment.

FIG. 3 illustrates a storage system 300 for utilizing different data storage types to store primary and replicated database directories, in accordance with a cloud-based or storage service-based embodiment. As an option, the storage system 300 may be implemented in the context of any one or more of the embodiments set forth in any previous and/or subsequent figure(s) and/or description thereof. Still yet, in one embodiment, the storage system 300 may be implemented in the context of an MPP system. Of course, however, the storage system 300 may be implemented in the context of any desired environment.

As shown, the storage system 300 includes a network interface 307, a plurality of nodes 304 coupled to the network interface 307, a corresponding plurality of primary storages 306 coupled to the plurality of nodes 304, and a share-type storage device 308 coupled to the network interface 307. Specifically, a DAS-type storage device 301 is provided with at least one primary database directory (P1, P2 ... PN) stored thereon. The DAS-type storage device 301 includes the plurality of nodes 304 each in communication with a corresponding one of the plurality of primary storages 306 of the DAS-type storage device 301. In use, each of the nodes 304 and data of the corresponding primary storage 306 are further accessible via the network interface 307, in the manner shown. For reasons that will become apparent later, the DAS-type storage device 301 may optionally be equipped with one or more spare nodes 305.

The storage system 300 is further shown to include the share-type storage device 308 with at least one replicated database directory (B1, B2 ... BN) stored thereon. In the current embodiment, such share-type storage device 308 may take the form of a cloud storage system, a storage-as-a-service system, or the like. As shown, the share-type storage device 308 includes a plurality of back-up replicated storages 310 storing at least one replicated database directory. In use, the back-up replicated storages 310 and corresponding replicated database directory may be accessible to the nodes 304 of the DAS-type storage device 301 via the network interface 307, in the manner shown. Further, if one or more of the nodes 304 of the DAS-type storage device 301 fail, database instances may be started on spare nodes (e.g. the spare node 305, etc.) or other nodes 304, and replicated database directories on the back-up replicated storages 310 may be used.

Figure 4:
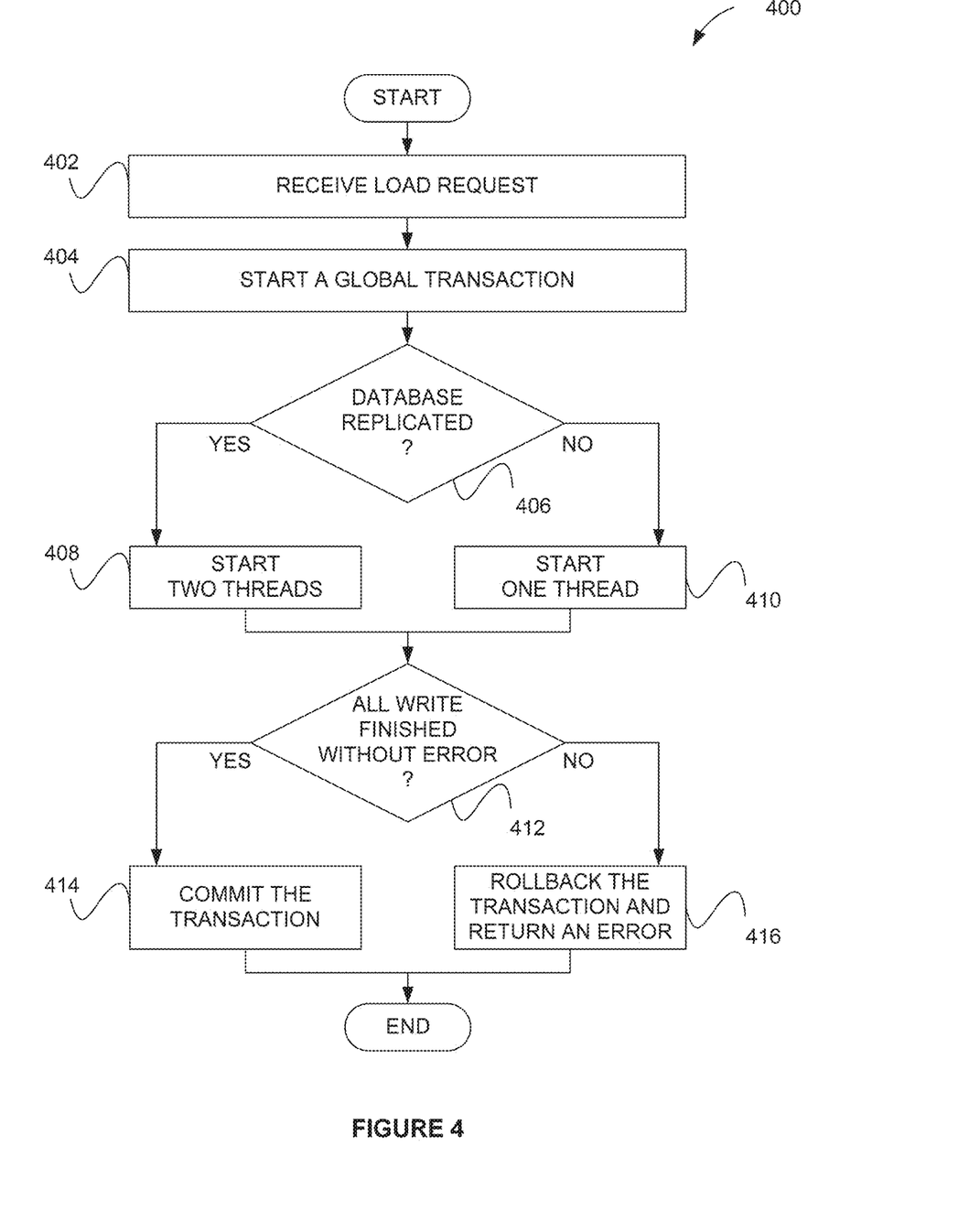
FIG. 4 illustrates a method for loading data, in accordance with one embodiment.

FIG. 4 illustrates a method 400 for loading data, in accordance with one embodiment. In particular, the method 400 outlines steps for loading data in a storage system, for the purpose of setting up the storage system for normal use.

As an option, the method 400 may be implemented in the context of any one or more of the embodiments set forth in any previous and/or subsequent figure(s) and/or description thereof. For example, the method 400 may be implemented for loading data in the context of the storage system 200 of FIG. 2, the storage system 300 of FIG. 3, or any other embodiment, for that matter. Of course, however, the method 400 may be implemented in the context of any desired environment.

In step 402, a load request is received, to initiate a data operation. Such load request may, for example, be received at any of a plurality of nodes (e.g. nodes 204/304 of FIG. 2/3, etc.) which access a first data storage of a first data storage type (e.g. primary storages 206/306 of FIG. 2/3, etc.). After receiving the load request, a global transaction is initiated in step 404.

In response to initiating the global transaction in step 404, it is determined whether a replicated database directory exists on a second data storage of a second data storage type. See decision 406. This may be accomplished, in one embodiment, by querying a corresponding back-up storage (e.g. back-up storages 210/310 of FIG. 2/3, etc.) associated with the aforementioned node that was the subject of the load request.

If it is determined that a replicated database directory exists in decision 406, at least two threads are started. See step 408. In one embodiment, the at least two threads include a first thread for performing the data operation on the primary database directory stored on the first data storage of the first data storage type, and a second thread for performing the data operation on the replicated database directory stored on the second data storage of the second data storage type. To this end, since both primary and replicated database directories are accessible to a database instance on a given node, there is not necessarily a need to move transaction logs to another node and apply the logs on that other node.

On the other hand, if it is determined that a replicated database directory does not exist in decision 406, a single thread is started. See step 410. Such single thread may be purposed for performing the data operation on the primary database directory stored on the first data storage of the first data storage type.

After step 408 or 410, it is then determined whether all writes have been finished without error in connection with the data operation. See decision 412. If it is determined that all writes have been finished without error in connection with the data operation per decision 412, the transaction is committed. See step 414. If, however, it is determined that all writes have not all been finished without error in connection with the data operation per decision 412, the transaction is rolled-back and an error is returned, so that the data operation may be re-attempted, etc.

Figure 5:
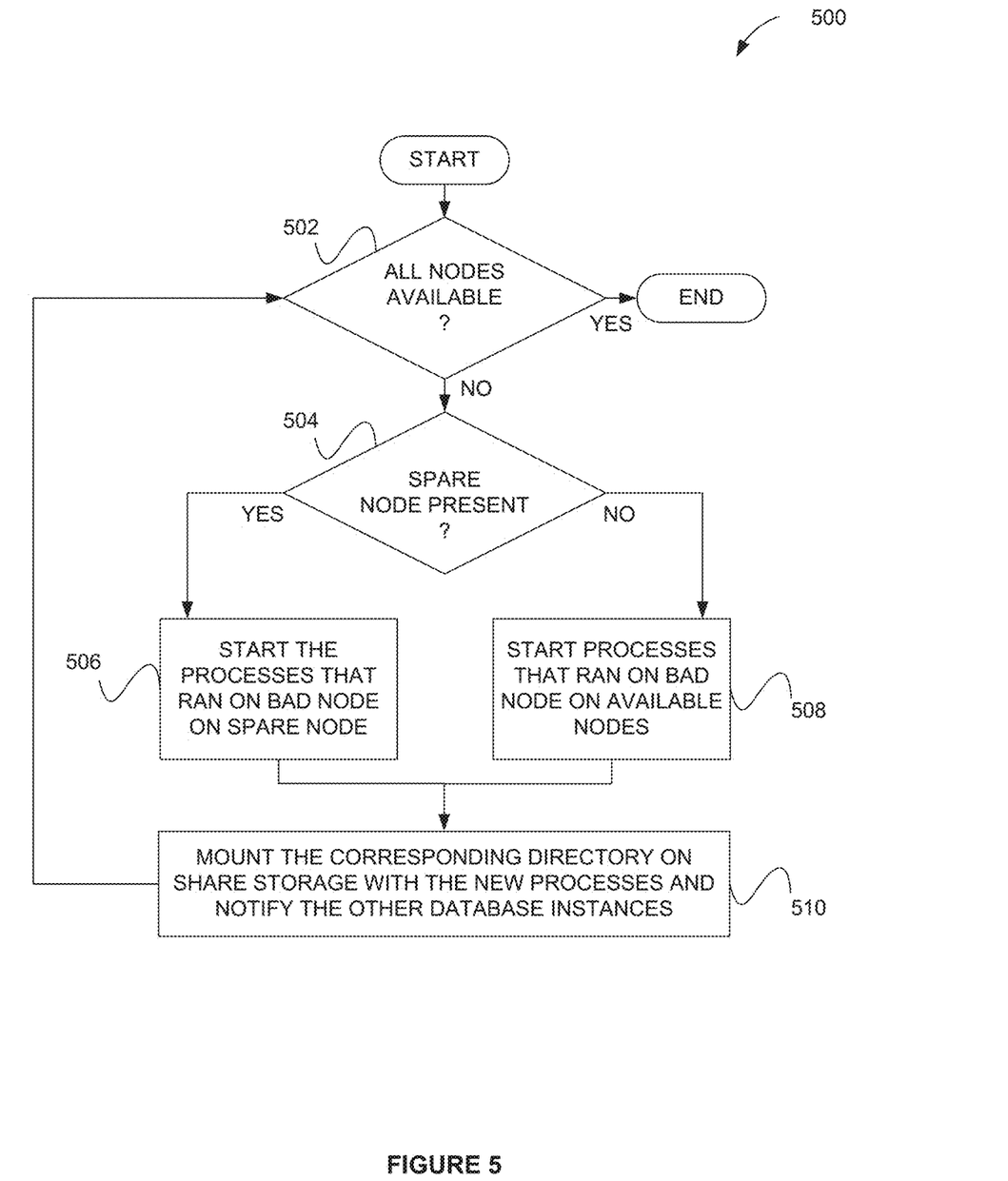
FIG. 5 illustrates a method for failover, in accordance with one embodiment.

FIG. 5 illustrates a method 500 for failover, in accordance with one embodiment. In use, the failover may be initiated in response to a hardware failure on a storage system. In particular, when such hardware failure has been identified, another working node (e.g. spare node, etc.) may be immediately set up and used to provide continuity of use.

As an option, the method 500 may be implemented in the context of any one or more of the embodiments set forth in any previous and/or subsequent figure(s) and/or description thereof. For example, the method 500 may be implemented for failover in the context of the storage system 200 of FIG. 2, the storage system 300 of FIG. 3, or any other embodiment, for that matter. Of course, however, the method 500 may be implemented in the context of any desired environment.

As shown, it is initially determined in decision 502 whether all nodes (e.g. nodes 204/304 of FIG. 2/3, etc) are available. If so, there is no need for failover. However, if it is determined in decision 502 that one or more nodes are unavailable, the method 500 continues since a failure has been detected in connection with the at least one node.

In decision 504, it is determined whether a spare node (e.g. spare node 305 of FIG. 3, etc.) exists. If so, any process that was running on the failed node is started on the spare node. See step 506. By using the spare node when available, impact on any other nodes is avoided. However, if it is determined in decision 504 that a spare node does not exist, any process that was running on the failed node is started on another node to the extent that it is available for accommodating such need for resources. See step 508. Either way, the replicated database directory stored on the second data storage may be accessed accordingly.

To this end, in step 510, the corresponding replicated database directory on the corresponding back-up storage (e.g. back-up storages 210/310 of FIG. 2/3, etc.) is mounted in connection with the newly started processes. Still yet, other database instances are notified accordingly.

Figure 6:
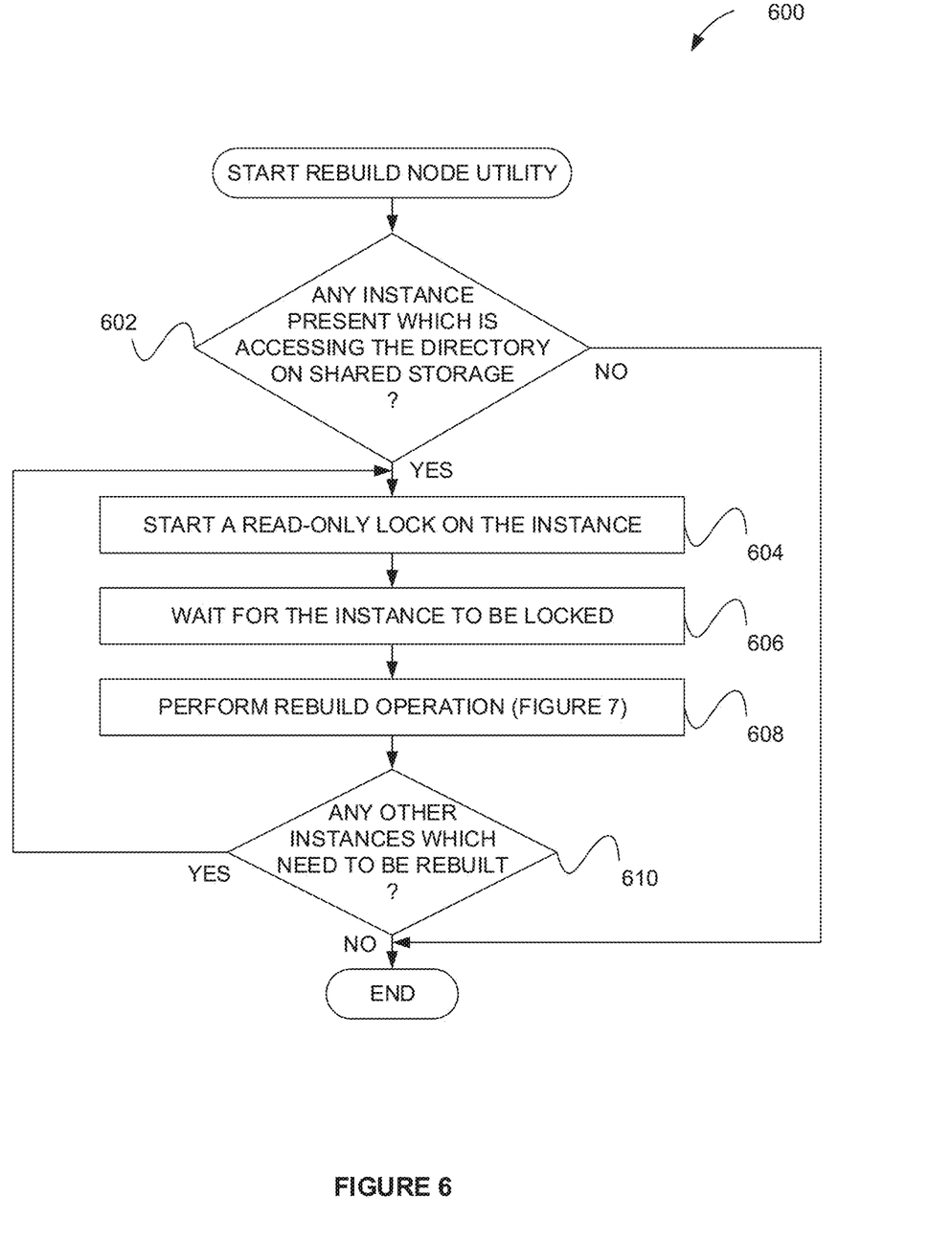
FIG. 6 illustrates a method for initiating a rebuild utility, accordance with one embodiment.

FIG. 6 illustrates a method 600 for initiating a rebuild utility, in accordance with one embodiment. As will be set forth below in greater detail, the rebuild utility may be initiated after a hardware failure has been fixed. Specifically, when such hardware failure has been fixed, database files may be moved from shared storage to nodes where database instances were running, so that normal operation may resume and better performance and availability may be achieved.

As an option, the method 600 may be implemented in the context of any one or more of the embodiments set forth in any previous and/or subsequent figure(s) and/or description thereof. For example, the method 600 may be implemented for initiating a rebuild utility in the context of the storage system 200 of FIG. 2, the storage system 300 of FIG. 3, or any other embodiment, for that matter. Of course, however, the method 600 may be implemented in the context of any desired environment.

As shown, in response to the initiation of a rebuild node utility, it is determined whether any instance present on a node (e.g. nodes 204/304 of FIG. 2/3, etc.) is accessing a replicated database directory on a back-up storage (e.g. back-up storages 210/310 of FIG. 2/3, etc.). See decision 602. If so, a read-only lock is started in connection with the replicated database directory stored on the second data storage. See step 604.

Next, a wait is initiated for the instance to be locked, as indicated in step 606. Further, a rebuild operation is initiated to rebuild database files required for operation. See step 608. An example of such rebuild step 608 in accordance with one embodiment, will be set forth in greater detail during reference to FIG. 7.

After the rebuild step 608, it is determined in step 610 whether any other instances need to be rebuilt. See decision 610. Only to the extent that more instances need to be rebuilt, steps 604-608 are repeated.

Figure 7:
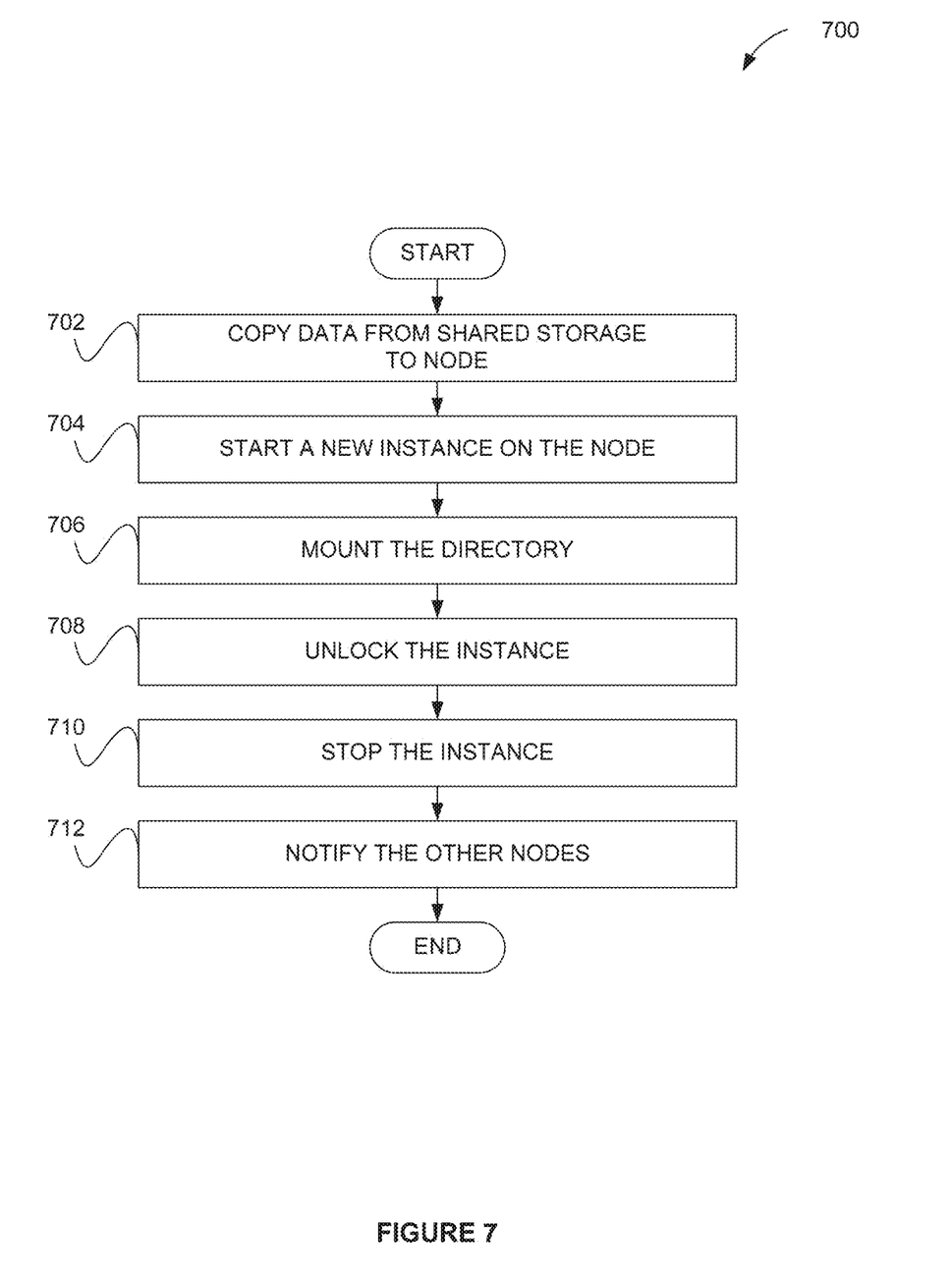
FIG. 7 illustrates a method for performing a rebuild operation, in accordance with one embodiment.

FIG. 7 illustrates a method 700 for performing a rebuild operation, in accordance with one embodiment. As mentioned earlier, the rebuild operation may be initiated after a hardware failure has been fixed. Specifically, when such hardware failure has been fixed, database files may be moved from shared storage to nodes where database instances were running, so that normal operation may resume and better performance and availability may be achieved.

As an option, the method 700 may be implemented in the context of any one or more of the embodiments set forth in any previous and/or subsequent figure(s) and/or description thereof. For example, the method 700 may be implemented for performing a rebuild operation in the context of step 608 of FIG. 6, or in any other context for that matter. Of course, however, the method 700 may be implemented in the context of any desired environment.

As shown, the rebuild operation may involve copying at least a portion of the replicated database directory stored on the second data storage (e.g. back-up storages 210/310 of FIG. 2/3, etc.) to a new data storage of the first data storage type (e.g. primary storages 206/306 of FIG. 2/3, etc.). See step 702. Next, per step 704, an instance is started on the at least one node (e.g. nodes 204/304 of FIG. 2/3, etc.).

Thereafter, the at least portion of the replicated database directory is mounted in connection with the instance. See step 706. The read-only lock is then unlocked in step 708 and the instance is stopped in step 710, since the rebuild operation is completed. Finally, the other nodes are notified in step 712.

Figure 8:
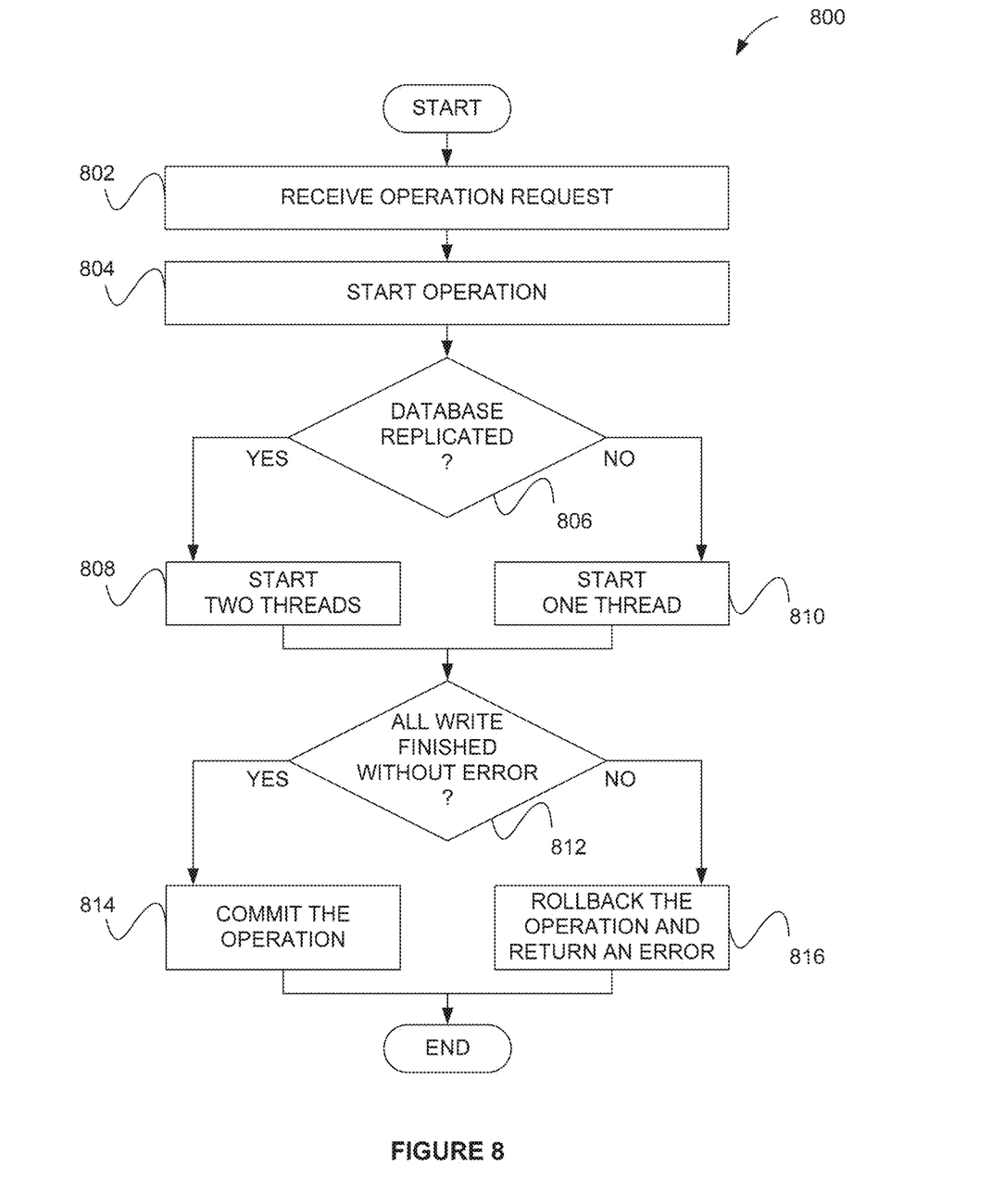
FIG. 8 illustrates a method for performing an operation (e.g. insert, update, delete, etc.), in accordance with one embodiment.

FIG. 8 illustrates a method 800 for performing a data operation (e.g. insert, update, delete, etc.), in accordance with one embodiment. Specifically, the method 800 outlines steps for carrying out at least one of a plurality of data operations during use of a storage system. In various embodiments, such data operation may include an insert operation, an update operation, a delete operation, and/or any other operation, for that matter.

As an option, the method 800 may be implemented in the context of any one or more of the embodiments set forth in any previous and/or subsequent figure(s) and/or description thereof. For example, the method 800 may be implemented for performing an operation in the context of the storage system 200 of FIG. 2, the storage system 300 of FIG. 3, or any other embodiment, for that matter. Of course, however, the method 800 may be implemented in the context of any desired environment.

In step 802, an operation request is received, to initiate an operation. In one embodiment, the operation request may, for example, be received at any of a plurality of nodes (e.g. nodes 204/304 of FIG. 2/3, etc.) which access a first data storage of a first data storage type (e.g. primary storages 206/306 of FIG. 2/3, etc.). After receiving the operation request, the requested operation is initiated in step 804.

In response to initiating the operation, it is determined whether a replicated database directory exists on a second data storage of a second data storage type. See decision 806. If it is determined that a replicated database directory exists in decision 806, at least two threads are started. See step 808. In one embodiment, the at least two threads include a first thread for performing the operation on the primary database directory stored on the first data storage of the first data storage type, and a second thread for performing the data operation on the replicated database directory stored on the second data storage of the second data storage type.

On the other hand, if it is determined that a replicated database directory does not exist in decision 806, a single thread is started. See step 810. Such single thread may be purposed for performing the operation on the primary database directory stored on the first data storage of the first data storage type.

Thereafter, it is then determined whether all writes have been finished without error in connection with the operation. See decision 812. If it is determined that all writes have been finished without error in connection with the operation per decision 812, the transaction is committed. See step 814. If, however, it is determined that all writes have not all been finished without error in connection with the operation per decision 812, the transaction is rolled-back and an error is returned. See step 816.

As mentioned in earlier in the context of one optional embodiment, a storage system may be configured such that a share-type storage device (and/or the associated network interface) has a first bandwidth that is greater than one or more of the primary storages of the DAS-type storage device, but less than an aggregation of all of the bandwidths of primary storages of a DAS-type storage device. In such embodiment, the input/output bandwidth of the share-type storage device is higher than one node of the DAS-type storage device (but tower than a total bandwidth of DAS of the DAS-type storage device). When the storage system does not have too many concurrent insert/update/delete queries, replication on the share-type storage device has optimal performance.

Figure 9:
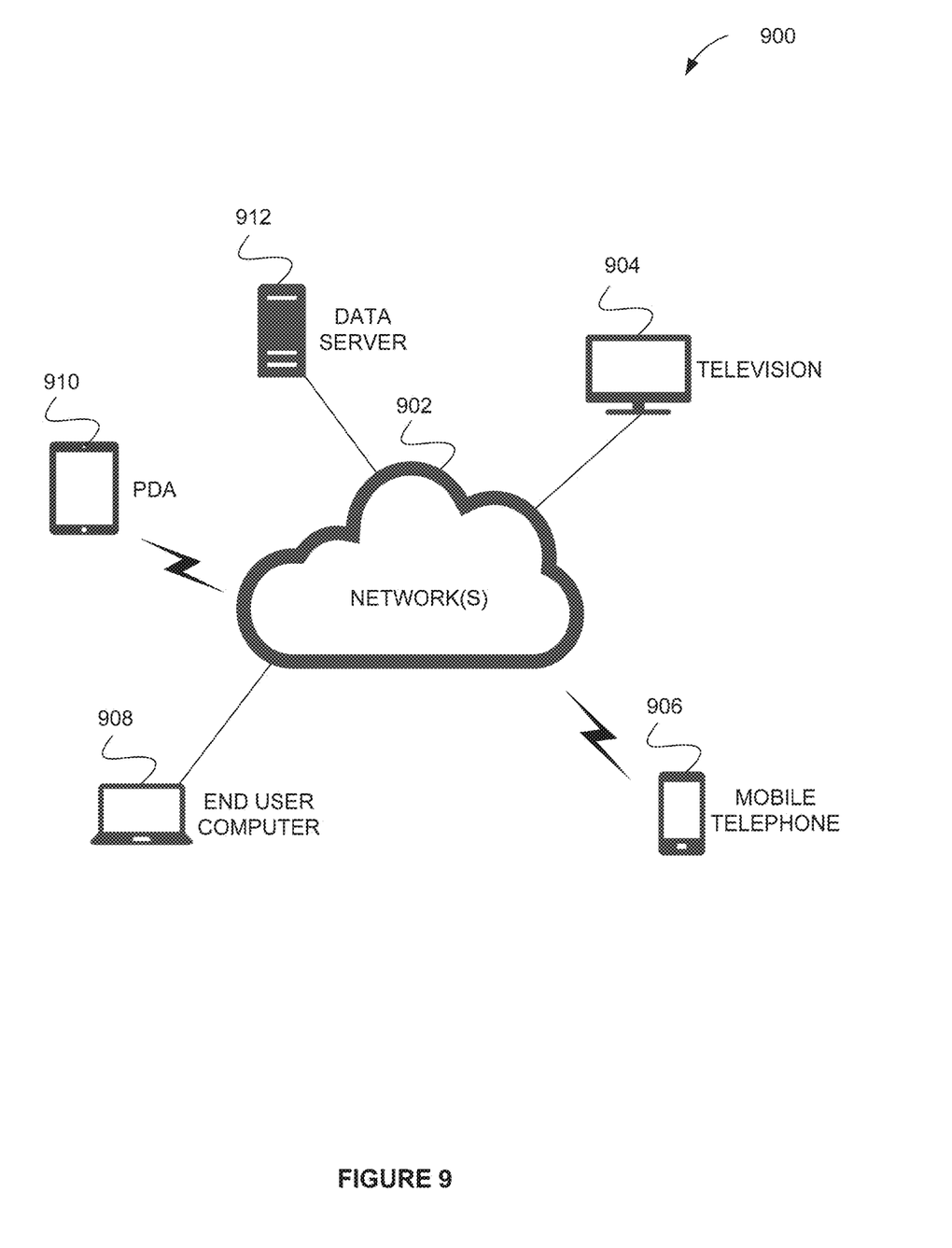
FIG. 9 illustrates a data storage network architecture, in accordance with one possible embodiment.

FIG. 9 illustrates a data storage network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a data server computer 912 and an end user computer 908 may be coupled to the network 902 for communication purposes. Such end user computer 908 may include a desktop computer, lap-top computer, and/or any other type of logic. Still yet, various other devices may be coupled to the network 902 including a personal digital assistant (PDA) device 910, a mobile phone device 906, a television 904, etc.

Figure 10:
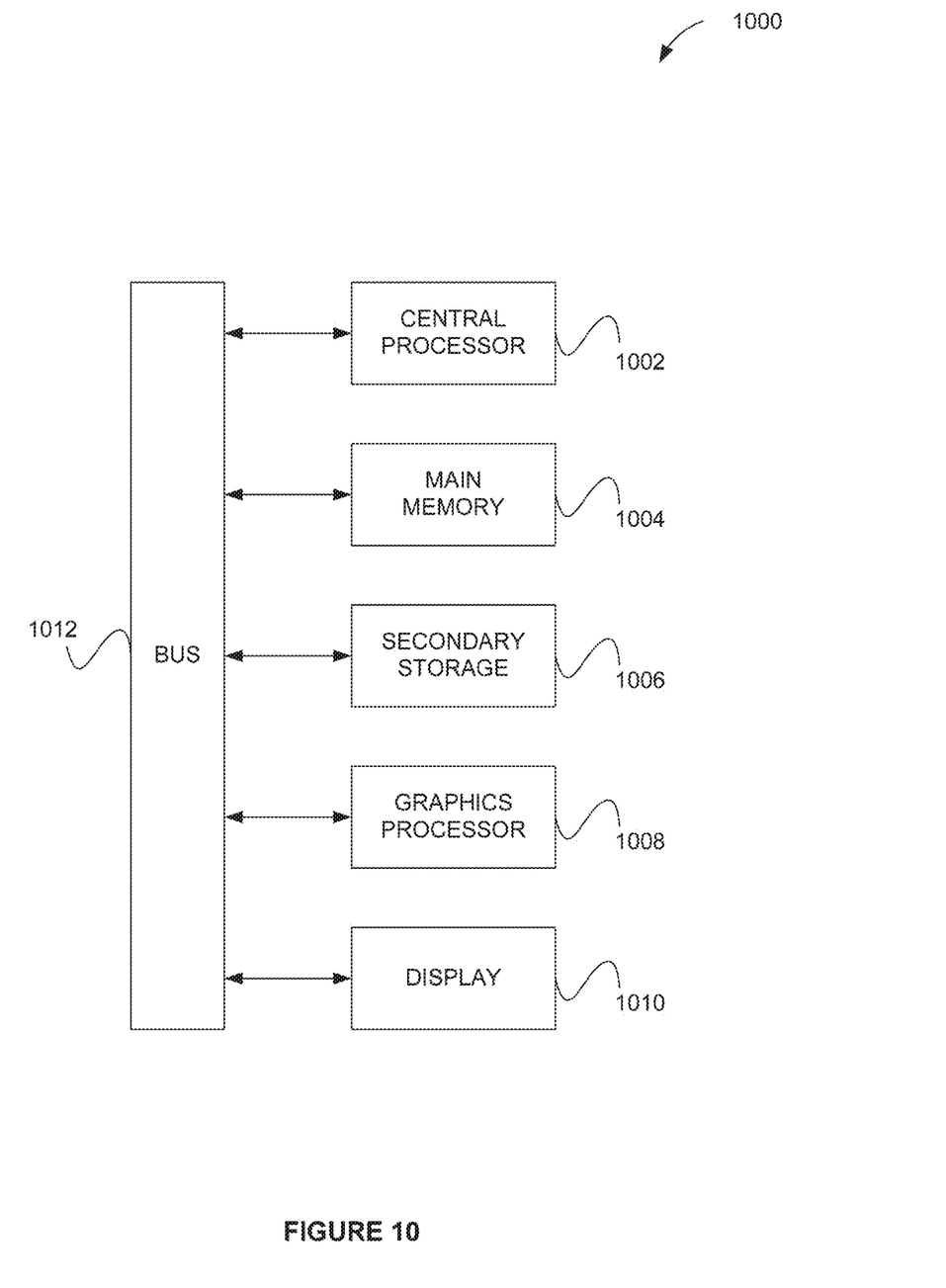
FIG. 10 illustrates an exemplary data storage system in accordance with one embodiment.

FIG. 10 illustrates an exemplary data storage system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1002 which is connected to a bus 1012. The system 1000 also includes main memory 1004 (e.g. random access memory (RAM), etc.). The system 1000 also includes a graphics processor 1008 and a display 1010 in this example.

The system 1000 may also include a secondary storage 1006. The secondary storage 1006 includes, for example, a hard disk drive and/or a removable storage drive, a floppy disk drive, a magnetic tape drive, a compact disk drive, etc. The removable storage drive reads from and/or writes to a removable storage unit in a well known manner.

Computer programs, or computer control logic algorithms, may be stored in the main memory 1004, the secondary storage 1006, and/or any other memory, for that matter. Such computer programs, when executed, enable the system 1000 to perform various functions (as set forth above, for example). Memory 1004, storage 1006 and/or any other storage are possible examples of tangible computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
   configuring each first data storage of a plurality of first data storages to store a primary database directory, the plurality of first data storages comprising a direct-access storage type, a first data storage of the plurality of first data storages being in communication with a corresponding node of the plurality of nodes, the first data storage being configured to store the primary database directory for access by only the corresponding node and is not shared with other nodes;
   detecting a failure in connection with at least one node of the plurality of nodes; and
   in response to detection of the failure, accessing a shared storage apparatus via a network interface coupled to the plurality of nodes, the shared storage apparatus including a plurality of second data storages, each second data storage of the plurality of second data storages configured to store a replicated database directory that replicates at least a portion of the primary database directory.

2. The method of claim 1, wherein after detecting the failure in connection with the at least one of the plurality of nodes, the method further comprising:
   determining whether a spare node exists.

3. The method of claim 2, further comprising:
   in response to the determination that the spare node exists, starting a database instance on the spare node for accessing the replicated database directory.

4. The method of claim 3, further comprising:
   in response to the determination that the spare node exists, mounting the replicated database directory in connection with the started database instance.

5. The method of claim 2, further comprising:
   in response to the determination that the spare node does not exist, starting a database instance on an available node for accessing the replicated database directory.

6. The method of claim 5, further comprising:
   in response to the determination that the spare node does not exist, mounting the replicated database directory in connection with the started database instance.

7. The method of claim 1, further comprising:
   initiating a rebuild operation; and
   starting a read-only lock in response to an instance accessing the replicated database directory.

8. The method of claim 7, the rebuild operation further comprising:
   copying at least a portion of the replicated database directory to a new data storage of the direct-access storage type.

9. The method of claim 8, the rebuild operation further comprising:
   starting a database instance on the node.

10. The method of claim 9, the rebuild operation further comprising:
    mounting at least the portion of the replicated database directory in connection with the started database instance.

11. The method of claim 10, the rebuild operation further comprising:
    removing the read-only lock and stopping the database instance.

12. The method of claim 1, further comprising:
    performing a data operation by determining whether the replicated database directory exists.

13. The method of claim 12, further comprising:
    in response to determining that the replicated database directory exists, starting at least two threads including a first thread for performing the data operation on the primary database directory and a second thread for performing the data operation on the replicated database directory.

14. The method of claim 13, wherein the at least two threads operate simultaneously to write data to the primary database directory and the replicated database directory respectively.

15. A system, comprising:
    at least one network interface;
    a plurality of nodes in communication with the at least one network interface;
    a plurality of first data storages of a direct-access storage type, a first data storage of the plurality of first data storages being in communication with a corresponding node of the plurality of nodes, the first data storage being configured to store a primary database directory for access by only the corresponding node and is not shared with other nodes; and
    a shared storage apparatus in communication with the at least one network interface and including a plurality of second data storages, each second data storage of the plurality of second data storages configured to store a replicated database directory that replicates at least a portion of the primary database directory, and at least one corresponding second data storage being accessed in response to a failure detected in connection with at least one node of the plurality of nodes.

16. The system of claim 15, wherein the system is configured for, in response to the detection of the failure in connection with the at least one node, determining whether a spare node exists.

17. The system of claim 16, wherein the system is configured for, in response to the determination that the spare node exists, starting a database instance on the spare node for accessing the replicated database directory.

18. The system of claim 17, wherein the system is configured for, in response to the determination that the spare node exists, mounting the replicated database directory in connection with the started database instance.

19. The system of claim 16, wherein the system is configured for, in response to the determination that the spare node does not exist, starting a database instance on an available node for accessing the replicated database directory.

20. The system of claim 19, wherein the system is configured for, in response to the determination that the spare node does not exist, mounting the replicated database directory in connection with the started database instance.

21. The system of claim 15, wherein the system is configured for initiating a rebuild operation.

22. The system of claim 21, wherein the system is configured such that the rebuild operation includes starting a read-only lock in response to an instance accessing the replicated database directory.

23. The system of claim 22, wherein the system is configured such that the rebuild operation further includes copying at least a portion of the replicated database directory to a new data storage of the direct-access storage type.

24. The system of claim 23, wherein the system is configured such that the rebuild operation further includes starting a database instance on the at least one node.

25. The system of claim 24, wherein the system is configured such that the rebuild operation further includes mounting at least the portion of the replicated database directory in connection with the started database instance.

26. The system of claim 25, wherein the system is configured such that the rebuild operation further includes removing the read-only lock and stopping the database instance.

27. The system of claim 15, wherein the system is configured for performing a data operation by determining whether the replicated database directory exists.

28. The system of claim 27, wherein the system is configured for, in response to determining that the replicated database directory exists, starting at least two threads including a first thread for performing the data operation on the primary database directory and a second thread for performing the data operation on the replicated database directory.

29. The system of claim 28, wherein the system is configured for, in response to determining that the replicated database directory does not exist, starting only a single thread for performing the data operation on the primary database directory.

30. The system of claim 15, wherein the system is configured for massive parallel processing.

31. A computer program product comprising computer executable instructions stored on a non-transitory computer readable medium that when executed by a processor instruct the processor to:
configure each first data storage of a plurality of first data storages to store a primary database directory, the plurality of first data storages comprising a direct-access storage type, a first data storage of the plurality of first data storages being in communication with a corresponding node of the plurality of nodes, the first data storage being configured to store the primary database directory for access by only the corresponding node and is not shared with other nodes;
detecting a failure in connection with at least one node of the plurality of nodes; and
in response to detection of the failure, accessing a shared storage apparatus via a network interface coupled to the plurality of nodes, the shared storage apparatus including a plurality of second data storages, each second data storage of the plurality of second data storages configured to store a replicated database directory that replicates at least a portion of the primary database directory.

32. The computer program product of claim 31, computer executable instructions further instruct the processor to:
determine a spare node exists; and
start a database instance on the spare node for accessing the replicated database directory.

33. The computer program product of claim 32, computer executable instructions further instruct the processor to:
mount the replicated database directory in connection with the started database instance.

34. The computer program product of claim 31, computer executable instructions further instruct the processor to:
determine a spare node does not exist; and
start a database instance on an available node for accessing the replicated database directory.

35. The computer program product of claim 34, computer executable instructions further instruct the processor to:
mount the replicated database directory in connection with the started database instance.

36. The computer program product of claim 31, computer executable instructions further instruct the processor to:
perform a data operation by determining whether the replicated database directory exists; and
in response to determining that the replicated database directory exists, start at least two threads including a first thread for performing the data operation on the primary database directory and a second thread for performing the data operation on the replicated database directory.

37. The computer program product of claim 36, wherein the at least two threads operate simultaneously to write data to the primary database directory and the replicated database directory respectively.

* * * * *